(12) United States Patent
Kim et al.

(10) Patent No.: US 6,902,819 B2
(45) Date of Patent: Jun. 7, 2005

(54) BIAXIALLY ORIENTED POLYESTER FILM

(75) Inventors: Sangil Kim, Suwon-si (KR); Changju Lee, Suwon-si (KR)

(73) Assignee: SKC Limited (KR)

( * ) Notice: Subject to any disclaimer, the term of this patent is extended or adjusted under 35 U.S.C. 154(b) by 0 days.

(21) Appl. No.: 10/499,077

(22) PCT Filed: Dec. 11, 2002

(86) PCT No.: PCT/KR02/02336
§ 371 (c)(1),
(2), (4) Date: Jun. 10, 2004

(87) PCT Pub. No.: WO03/054067
PCT Pub. Date: Jul. 3, 2003

(65) Prior Publication Data
US 2005/0019595 A1 Jan. 27, 2005

(30) Foreign Application Priority Data
Dec. 11, 2001 (KR) .............. 10-2001-0078045

(51) Int. Cl.[7] .......... C08G 63/02; C08G 63/16; C08G 63/18; C08G 63/181; C08G 63/183
(52) U.S. Cl. .......... 428/480; 428/910; 528/308; 528/308.1; 528/308.6; 528/308.7
(58) Field of Search .......... 428/480, 910; 528/308, 308.1, 308.6, 308.7

(56) References Cited

U.S. PATENT DOCUMENTS 5,958,581 A * 9/1999 Khanarian et al. .......... 428/357
6,573,340 B1 * 6/2003 Khemani et al. .......... 525/437

FOREIGN PATENT DOCUMENTS

| JP | 03-290229 | * 12/1991 |
| JP | 04-257418 | * 9/1992 |
| JP | 06-065409 | * 3/1994 |
| JP | 10-249935 | * 9/1998 |
| WO | WO 02/078944 | * 10/2002 |

* cited by examiner

Primary Examiner—Vivian Chen
(74) Attorney, Agent, or Firm—Anderson Kill & Olick, PC

(57) ABSTRACT

The biaxially oriented polyester film of the present invention useful for twist wrapping is prepared by biaxially drawing a polyester sheet which has a glass transition temperature (Tg) of at least 60° C., in the longitudinal and transverse directions, wherein the biaxially oriented film has a specific gravity of 1.38 or less.

12 Claims, 4 Drawing Sheets

BIAXIALLY ORIENTED POLYESTER FILM

FIELD OF THE INVENTION

The present invention is directed to a biaxially oriented polyester film for twist wrapping.

BACKGROUND OF THE INVENTION

Twist wrapping has been extensively used for wrapping candies by twisting one or both of film ends. Such twist wrapping films are formed of a cellophane film and a uniaxially oriented polyethylene or polyvinyl chloride film.

However, cellophane films are disfavored because the cost of production is high due to the necessity to treat toxic pollutants emitted during manufacturing thereof. Uniaxially oriented polyethylene or polyvinyl chloride films, on the other hand, have the problem of insufficient twist fixing property.

Therefore, there has been attempts to prepare polyester films having good twist wrapping properties and mechanical and chemical properties, without any environmental or food hygienic problems.

For example, Japanese Laid-open Patent Publication No. Hei 2-127022 discloses that a polyester film for twist wrapping can be prepared by melt extruding a polyester resin having an intrinsic viscosity of 0.5~1 and a melt viscosity of more than 2,300 poise at 265° C., drawing at a ratio of 2~150, and quenching between a first quenching roll having a temperature of 40° C.~glass transition temperature (Tg) and a second quenching roll having a temperature of Tg~Tg+15° C.

Further, Japanese Laid-open No. Sho 61-277422 discloses a process for preparing a polyester film having a haze of more than 6% by melt extruding a polyester copolymer manufactured from terephthalic acid and a mixture of 1,4-butanediol and polyethylene glycol of MW 106~550 and quenching by contacting the film with a cooling drum of 50~80° C. for more than 8 sec.

However, above processes suffer from poor processibility and the printability of the resulting film is not satisfactory. Meanwhile, Japanese Laid-open Publication No. Sho 57-102317 discloses a tubular polyester film for twist wrapping prepared by extruding a polyester resin having an intrinsic viscosity of more than 0.8 to attain a sheet and biaxially drawing the sheet at a ratio of 3~4. Japanese Laid-open Publication No. Sho 57-66933 discloses a process for preparing a tubular polyester film having a thickness of 60 micron or less by extruding a polyester resin having an intrinsic viscosity of more than 0.72 and melt viscosity of more than 6000 poise at 265° C. through an annular die; blowing at a blow ratio more than 1; and cold drawing.

However, such tubular films also have the problems of poor processibility and unsatisfactory printability.

Japanese Laid-open Publication No. Sho 51-19049 discloses a biaxially oriented polyester film comprising 95~30% by weight of a polyester having a melting point of above 180° C. and; 5~70% by weight of a low molecular weight polyester having an intrinsic viscosity of 0.35 or less. However, this film easily tears during the film making process.

SUMMARY OF THE INVENTION

Accordingly, it is a primary object of the present invention to provide a polyester film having improved twist wrapping property, printability and processibility in addition to improved mechanical and chemical properties, environmental acceptability and food sanitary safety.

The above object of the invention can be accomplished by a biaxially oriented polyester film prepared by biaxially drawing a polyester sheet having a glass transition temperature of not less than 60° C., wherein the film has a specific gravity of at least 1.38.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

Figure 3:
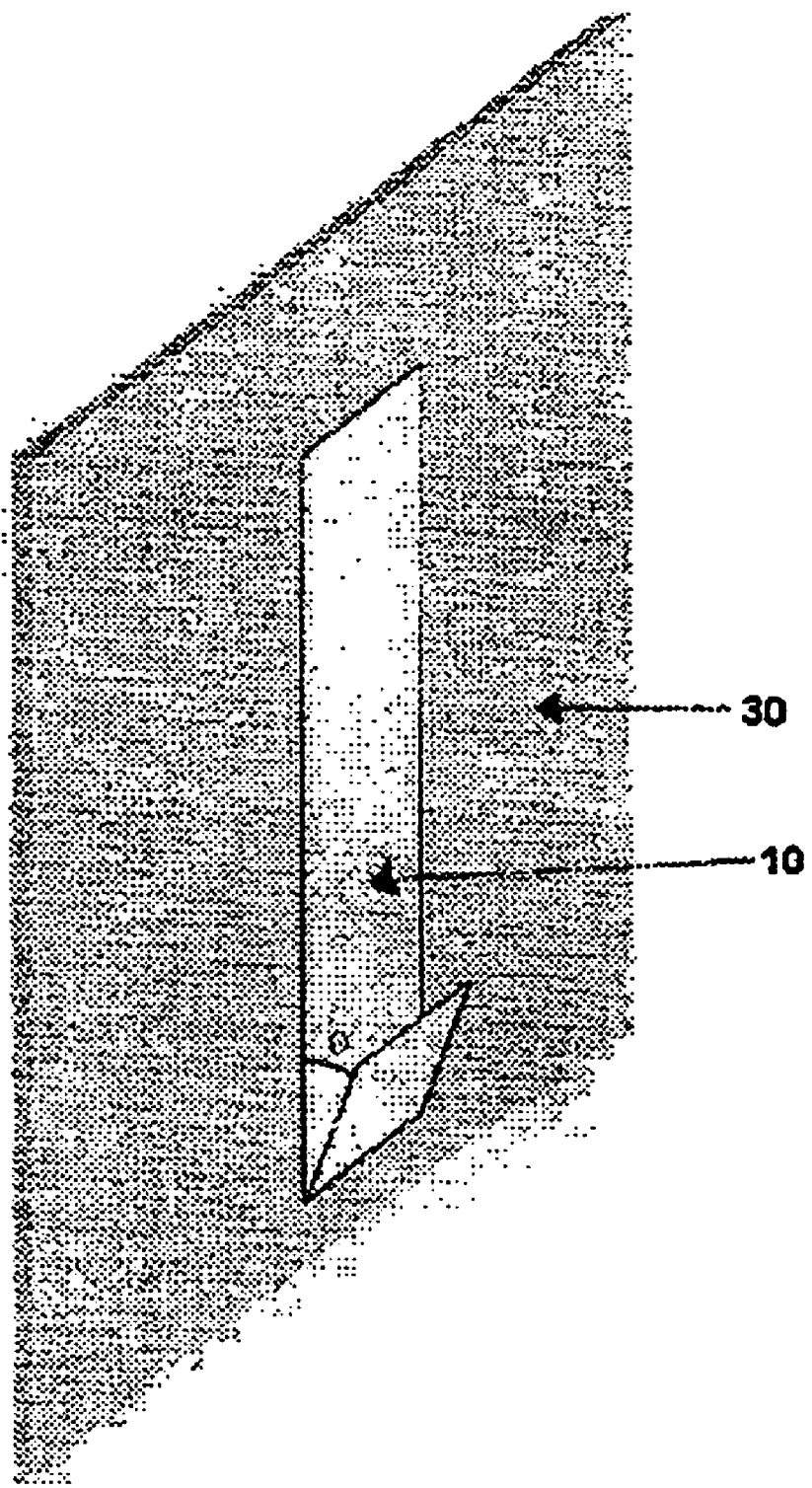

The biaxially oriented polyester film according to the present invention has a dead-fold retainability of not less than 60%, which is defined by the following equation:

$$\text{Dead-fold retainability (\%)} = (180 - \theta) \times 100 / 180$$

wherein $\theta$ is the fold angle observed when a polyester film sheet is folded under a pressure of 30 psi for 3 seconds at room temperature and the folded sheet is kept at a vertical position for 1 hr (cf. FIG. 3).

The biaxially oriented polyester film according to the present invention may be prepared by drawing a polyester sheet so that the product of the longitudinal and transverse draw ratios is in the range of 4 to 20.

According to the preferred example of the present invention, drawing in the longitudinal direction is conducted at a temperature between Tg of the polyester sheet and Tg+30° C., and drawing in the transverse direction, at Tg+10° C.~Tg+40° C.

The biaxially oriented polyester film according to the present invention may have a refractive index of more than 1.6, either the longitudinal or transverse direction.

The biaxially oriented polyester film according to the present invention may be prepared by biaxially drawing a polyester sheet in the longitudinal and transverse directions, the polyester sheet being manufactured from one or more resins obtained by polycondensating an acid component comprising an aromatic dicarboxylic acid with a glycol component.

In a preferred embodiment, the aromatic dicarboxylic acid is dimethyl terephthalate or terephthalic acid. It is also preferable that the acid component further comprises other aromatic dicarboxylic acid such as isophthalic acid, naphthalene dicarboxylic acid, dimethyl isophthalate, dimethyl-2,6-naphthalene dicarboxylate, etc.

It is preferable that the alkylene glycol is ethylene glycol. It is also preferable that the alkylene glycol further comprises other alkylene glycol component such as dimethylene glycol, trimethylene glycol, teteramethylene glycol, 1,4-cyclohexane dimethanol or 2,2-dimethyl(-1,3-propane)diol.

In a preferred embodiment, Tg of the polyester resin used in the present invention is 60° C. or higher. If Tg of the polyester resin is less than 60° C., mechanical and thermal properties of the polyester become unsatisfactory.

The polyester sheet used in the present invention may be prepared from a blend of polyester resins obtained by polymerizing the aforementioned aromatic dicarboxylic acid and glycol component.

The biaxially oriented polyester film according to the present invention may further comprise other components such as a polycondensation catalyst, dispersant, electrostatic generator, antistatic agent, antiblocking agent and inorganic lubricant.

The biaxially oriented polyester film according to the present invention is prepared by biaxially drawing a polyester sheet having a glass transition temperature of 60° C. or higher, wherein the film has a specific gravity of 1.38 or less.

The specific gravity of a polyester film is a measure of crystallinity of the film, and the relationship between a specific gravity and crystallinity may be expressed as follows:

$$Xc=\{dc\times(d-da)\}\times100/\{d\times(dc-da)\}$$

wherein, Xc is crystallization degree (%), d is specific gravity, dc is specific gravity at 100% crystallization (1.455 in case of polyethylene terephthalate), and da is specific gravity at 100% amorphous (1.335 in case of polyethylene terephthalate).

According to the above equation, when the specific gravity of a film is 1.38, the crystallization degree of the film is about 40%.

The crystallization degree of a polyester film is an important factor influencing the retainability of dead-fold and twist wrapping properties of film. Thus, if the crystallization degree is more than 40%, the dead-fold retainability and twist wrapping properties become unsatisfactory.

The crystallization degree of a polyester film is generally dependent on process conditions such as drawing ratio or drawing temperature. The inventive polyester film is drawn in the longitudinal direction at a temperature of Tg~Tg+30° C. The transverse direction drawing is conducted at a temperature of Tg+10° C.~Tg+40° C.

If the longitudinal drawing is conducted at a temperature lower than Tg, or if the transverse drawing is conducted at a temperature lower than Tg+10° C., the surface of film becomes cloudy due to the cold drawing. On the other hand, if the longitudinal drawing is conducted at a temperature higher than Tg+30° C., or if the transverse drawing is conducted at a temperature higher than Tg+40° C., the twist wrapping property becomes poor due to excessive degree of crystallization.

Further, it is preferable that the drawing ratio in the transverse direction is not less than 2, and the product of the drawing ratios in the longitudinal and transverse directions is in the range of 4 to 20. The crystallization degree of a biaxially oriented polyester film prepared as described above become less than 40% (corresponds to a specific gravity of 1.38 in case of polyethylene terephthalate), and such a film shows improved twist wrapping property. If the transverse drawing ratio is less than 2, the film thickness becomes non-uniform. Therefore, it is preferable that the drawing ratio in the transverse direction is kept at 2 or higher.

Further, if the product of the drawing ratios in the longitudinal and transverse directions is less than 4, the film orientation in the longitudinal direction is not sufficient and, therefore, the film tears easily in the transverse direction during the film making process. On the other hand, if the product of the drawing ratios is more than 20, the film orientation becomes excessive and the twist wrapping property of the film deteriorates.

It is preferable that the biaxially oriented polyester film has a refractive index of more than 1.6, either the longitudinal or transverse direction.

The dead-fold retainability in the longitudinal and transverse directions of the inventive film is at least 60%, preferably at least 70%. If the dead-fold retainability is less than 60%, the twist wrapping property becomes unsatisfactory.

Further, the twisting property in the transverse direction of the film is dependent on the dead-fold retainability in the longitudinal direction of the film. On the other hand, the twisting property in the longitudinal direction of the film is dependent on the dead-fold retainability in the transverse direction of the film. Therefore, depending on the use of film, the dead-fold retainability in either direction of is preferably kept at 60% or higher. Preferably, the inventive film has a dead-fold retainability of at least 60% in both directions.

The present invention is further described and illustrated in Examples, which are, however, not intended to limit the scope of the present invention.

The polyester films manufactured in examples were examined for the following properties.

(1) Specific Gravity: Density gradient tube method (ASTM D1505, JIS K7112)

(2) Refractive Index: Refractive indexes in the longitudinal and transverse directions of film were measured with Abbe Refractor (3) Dead-fold retainability (%)

a. Transverse direction

Figure 1:
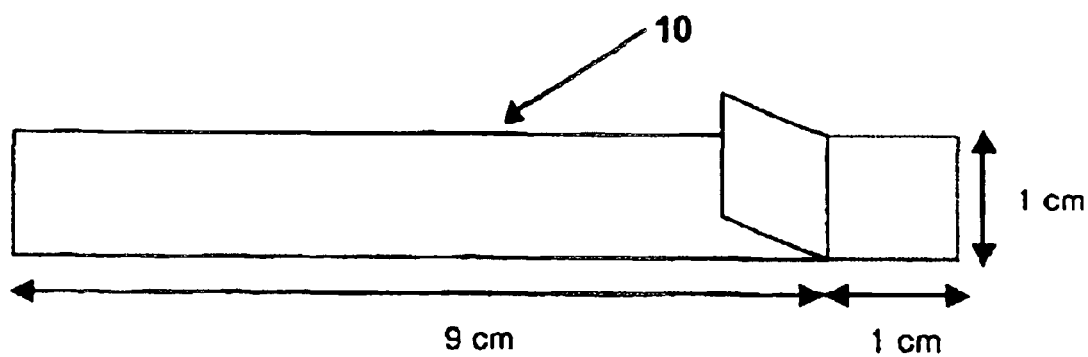
FIGS. 1 to 3: a schematic diagram for measuring a retainability of dead-fold of the polyester film in accordance with one embodiment of the present invention.
Figure 2:
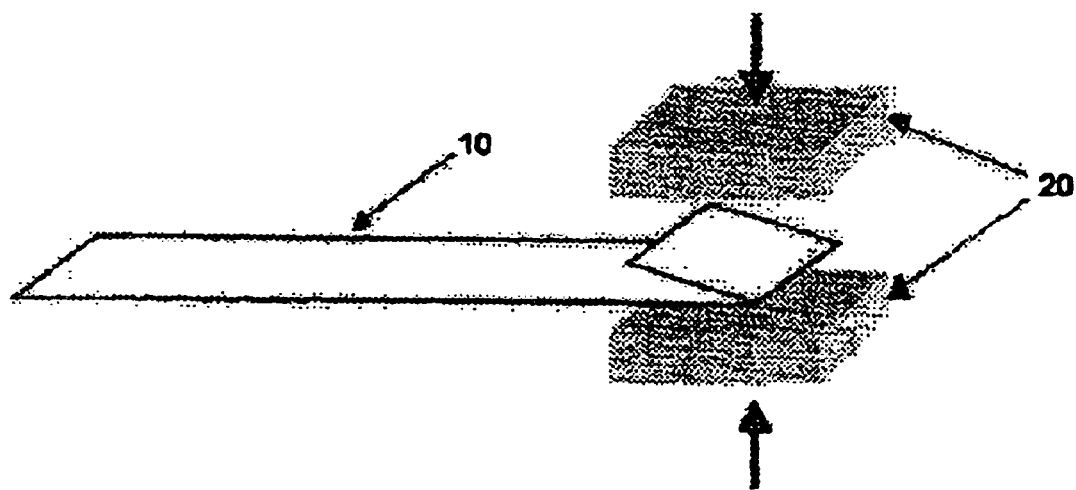

As shown in FIG. 1, a film specimen (10) of 10 cm (transverse direction)×1 cm (longitudinal direction) is folded at the 9 cm point in the transverse direction. Using a pressure applying means (20) (Sentinel Brand Machine, Model No. 12-AS, Hot-Press, Packaging Industries Group, Inc., Hyannis, Mass. 02601, USA), a pressure of 30 psi is uniformly applied on the folded part of the film specimen at room temperature (23~25° C.) for 3 seconds as shown in FIG. 2. Then, the film specimen is kept at a vertical position for 1 hr and the angle (θ) formed at the folded part of film specimen was measured. Dead-fold retainability (%) are determined as following equation.

$$\text{Dead-fold retainability (\%)}=(180-\theta)\times100\ 180$$

b. Mechanical direction

The above procedure was repeated using a film specimen (10) of 10 cm (transverse direction)×1 cm (longitudinal direction).

(4) Twist fixation in transverse direction

Figure 4:
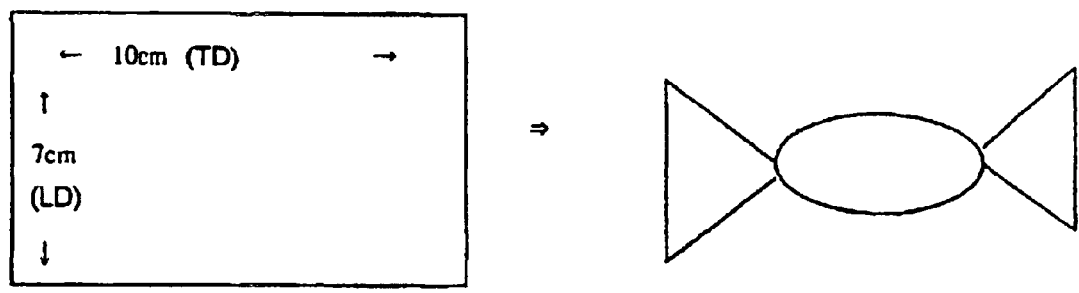
FIG. 4: a schematic diagram for measuring twist fixation in transverse direction of the polyester film in accordance with one embodiment of the present invention.

As shown in FIG. 4, a film specimen of 10 cm (transverse direction)×7 cm (longitudinal direction) is prepared and hard candy was wrapped therewith by 540° twisting (1.5 turn) in the transverse direction. The wrapped candy was left standing for 24 hrs and the maintained twisting angle was measured. Twist fixation is determined as follows:

$$\text{Twist fixation (\%)}=\text{maintained twist angle/initial twist angle (540°)}$$

(5) Glass transition temperature:
Differential Scanning Calorimeter (Perkin-Elmer DSC-7)
Temperature rising 20° C./min (6) Film Strength (ASTM D882):
Strength at break was measured using 100 mm×15 mm specimen at a rate of 200 mm/min and at room temperature (23±2° C.).

(7) Film thickness difference:
The film thickness was measured at 50 points which were arranged at 5 cm intervals in both the longitudinal and transverse directions.

Thickness difference (%)=(Tmax−Tmin)×100/Tave wherein Tmax is maximum thickness of film; Tmin is minimum thickness of film; and Tave is average thickness of film.

EXAMPLE 1

100 parts by mole of dimethyl terephthalate and 180 parts by mole of ethylene glycol were placed in an autoclave equipped with a distillation column, heated to 150° C., and manganese acetate (an interesterification catalyst), was added thereto in an amount of 0.05% by weight based on the weight of dimethyl terephthalate. While removing methanol formed, the temperature was raised to 220° C. over a period of 120 min. After the interesterification was complete, trimethylphosphate (a stabilizer) was added in an amount of 0.045% by weight based on the weight of dimethyl terephtalalte, and silicon dioxide having an average particle diameter of 2 micron (an antiblocking agent) was added in an amount of 0.1% by weight based on the amount of dimethyl terephthalate. After 10 minutes, antimonytrioxide (polymerization catalyst) was added in an amount of 0.03% by weight based on the weight of dimethyl terephthalte, and the resulting product was transferred to a second reactor equipped with a vacuum unit, and reacted at 280° C. for about 140 minutes, to obtain a polyethylene terephthalate (Tg 78° C.) having an intrinsic viscosity of 0.66 dl/g.

The polyester thus obtained was melted at 280° C., extruded through a T-die having a width of 820 mm, and cooled by a casting roller maintained at 30° C., to obtain an amorphous sheet of 780 mm width and 225 micron thickness. The amorphous sheet was drawn at a ratio of 3 in the longitudinal direction at 94° C., and then, drawn 3 times in the transverse direction at 100° C., to obtain a biaxially drawn polyester film of 2,250 mm wide and 25 micron thick.

The drawing conditions for polyester film obtained above are shown in Table 1, and properties of the film, i.e., film strength, specific gravity, crystallization, refractive index, dead-fold retainability and twist fixation measured, in Table 2.

EXAMPLES 2 to 10 AND COMPARATIVE EXAMPLES 1 to 5

The procedure of Example 1 was repeated except that various drawing conditions shown in Table 1 were used. The properties and resulting of biaxially oriented polyester films are shown in Table 2.

TABLE 1

| Example No. | Sheet Thickness (micron) | Longitudinal Direction (LD) Temp. (° C.) | Ratio | Transverse Direction (TD) Temp. (° C.) | Ratio | Total Drawing ratio | Biaxially oriented film Width (mm) | Thickness (micron) | Difference (%) |
|---|---|---|---|---|---|---|---|---|---|
| 1 | 225 | 94 | 3.0 | 100 | 3.0 | 9 | 2250 | 25 | 3 |
| 2 | 263 | 98 | 3.5 | 100 | 3.0 | 10.5 | 2250 | 25 | 3 |
| 3 | 188 | 91 | 2.5 | 100 | 3.0 | 7.5 | 2250 | 25 | 4 |
| 4 | 158 | 88 | 2.1 | 100 | 3.0 | 6.3 | 2250 | 25 | 5 |
| 5 | 263 | 94 | 3.0 | 104 | 3.5 | 10.5 | 2625 | 25 | 3 |
| 6 | 188 | 94 | 3.0 | 98 | 2.5 | 7.5 | 1875 | 25 | 6 |
| 7 | 150 | 94 | 3.0 | 98 | 2.0 | 6 | 1500 | 25 | 7 |
| 8 | 306 | 97 | 3.5 | 104 | 3.5 | 12.25 | 2625 | 25 | 3 |
| 9 | 219 | 91 | 2.5 | 104 | 3.5 | 8.75 | 2625 | 25 | 3 |
| 10 | 219 | 97 | 3.5 | 98 | 2.5 | 8.75 | 1875 | 25 | 4 |
| Com. Ex. 1 | 563 | 94 | 5.0 | 100 | 4.5 | 22.5 | 3150 | 25 | 2 |
| Com. Ex. 2 | 225 | 125 | 3.0 | 100 | 3.0 | 9 | 2250 | 25 | 3 |
| Com. Ex. 3 | 225 | 94 | 3.0 | 130 | 3.0 | 9 | 2250 | 25 | 3 |
| Com. Ex. 4 | 225 | 125 | 3.0 | 130 | 3.0 | 9 | 2250 | 25 | 4 |
| Com. Ex. 5 | 68 | 94 | 1.5 | 100 | 1.8 | 2.7 | 1350 | 25 | 20 |

TABLE 2

| Example No. | Film strength (kgf/mm2) LD | TD | Specific gravity | Crystallization (%) | Dead-fold retainability (%) LD | TD | Refractive index LD | TD | Twist Fixation (%) |
|---|---|---|---|---|---|---|---|---|---|
| 1 | 22 | 22 | 1.355 | 18 | 84 | 86 | 1.633 | 1.635 | 85 |
| 2 | 24 | 22 | 1.357 | 20 | 82 | 80 | 1.637 | 1.634 | 82 |
| 3 | 20 | 22 | 1.352 | 15 | 86 | 88 | 1.628 | 1.636 | 87 |
| 4 | 18 | 22 | 1.350 | 13 | 90 | 90 | 1.621 | 1.636 | 90 |
| 5 | 23 | 26 | 1.360 | 22 | 80 | 82 | 1.632 | 1.638 | 81 |
| 6 | 22 | 20 | 1.353 | 16 | 86 | 84 | 1.634 | 1.629 | 85 |
| 7 | 21 | 18 | 1.351 | 14 | 88 | 88 | 1.635 | 1.627 | 90 |
| 8 | 25 | 24 | 1.362 | 24 | 78 | 78 | 1.637 | 1.638 | 80 |
| 9 | 20 | 25 | 1.354 | 17 | 84 | 86 | 1.631 | 1.639 | 84 |
| 10 | 25 | 20 | 1.354 | 17 | 84 | 84 | 1.638 | 1.63 | 84 |

TABLE 2-continued

| Example No. | Film strength (kgf/mm2) | | Specific gravity | Crystallization (%) | Dead-fold retainability (%) | | Refractive index | | Twist Fixation (%) |
|---|---|---|---|---|---|---|---|---|---|
| | LD | TD | | | LD | TD | LD | TD | |
| Comp. Ex. 1 | 27 | 28 | 1.388 | 46 | 42 | 42 | 1.655 | 1.658 | 40 |
| Comp. Ex. 2 | 23 | 22 | 1.385 | 44 | 50 | 50 | 1.634 | 1.635 | 45 |
| Comp. Ex. 3 | 22 | 24 | 1.386 | 45 | 45 | 45 | 1.634 | 1.634 | 48 |
| Comp. Ex. 4 | 23 | 23 | 1.392 | 50 | 40 | 40 | 1.634 | 1.633 | 35 |
| Comp. Ex. 5 | a) | a) | a) | a) | a) | a) | 1.588 | 1.592 | broken | a) a satisfactory film was not formed due to poor processibility.

Using each of the biaxially oriented polyester films obtained Examples 1 to 10 and Comparative Examples 1 to 5, hard candies were twist wrapped at a rate of 600 pieces/min. If the film was broken during the wrapping process, or if more than 5% of the packed candies were released after 24 hrs is more than 5%, the film was evaluated as "poor". As shown in Table 2, the film of Examples 1 through 10 show improved properties for twist wrapping, while the films of comparative examples 1 through 5 were evaluated as poor.

Thus, the inventive biaxially oriented polyester films has good dead-fold retainability which is useful for twist wrapping of candies in addition to intrinsic properties of polyester film such as high thermal stability, weatherability, physical properties and chemical resistance.

While the invention has been described with respect to the above specific embodiments, it should be recognized that various modifications and changes may be made to the invention by those skilled in the art which also fall within the scope of the invention as defined by the appended claims.

What is claimed is:

1. A biaxially oriented polyester film prepared by biaxially drawing a polyester sheet which has a glass transition temperature (Tg) of 60° C. or higher, in the longitudinal and transverse directions, wherein the biaxially oriented film has a specific gravity of 1.38 or less and a dead-fold retainability of at least 60% defined as below:

Dead-fold retainability (%)=(180−θ)×100/180 wherein θ is an angle formed when a polyester film sheet is folded under a pressure of 30 psi for 3 seconds at room temperature and the folded sheet is kept at a vertical position for 1 hr.

2. The biaxially oriented polyester film of claim 1, wherein the polyester sheet is prepared from one or more resins obtained by polycondensation of a dicarboxylic acid component and an alkylene glycol component.

3. The biaxially oriented film of claim 2, wherein the dicarboxylic acid component comprises dimethyl terephthalate or terephthalic acid.

4. The biaxially oriented film of claim 3, wherein the dicarboxylic acid component further comprises at least one aromatic dicarboxylic acid selected from the group consisting of isophthalic acid, naphthalene dicarboxylic acid, dimethyl isophthalate, dimethyl-2,6-naphthalene dicarboxylate.

5. The biaxially oriented film of claim 2, wherein the alkylene glycol component comprises ethylene glycol.

6. The biaxially oriented film of claim 5, wherein the alkylene glycol component further comprises at least one alkylene glycol selected from the group consisting of diethylene glycol, trimethylene glycol, tetramethylene glycol, 1,4-cyclohexane dimethanol and 2,2-dimethyl(-1,3-propane)diol.

7. The biaxially oriented film of claim 1, wherein the crystallization degree of the film is less than 40%.

8. The biaxially oriented film of claim 1, wherein the product of drawing ratios in the longitudinal and transverse directions is in the range of 4 to 20.

9. The biaxially oriented film of claim 1, wherein the drawing in the longitudinal direction is conducted at a temperature in the range of Tg of the polyester sheet and Tg+30° C.

10. The biaxially oriented film of claim 1, wherein the drawing in the transverse direction is conducted at a temperature in the range of Tg of the polyester sheet +10° C. and Tg+40° C.

11. The biaxially oriented film of claim 1, wherein the refractive indexes of the film in the longitudinal and transverse directions are each 1.6 or higher.

12. The biaxially oriented film of claim 1, wherein the film is used for twist wrapping.

* * * * *